US008641048B2

(12) United States Patent
Garber et al.

(10) Patent No.: US 8,641,048 B2
(45) Date of Patent: Feb. 4, 2014

(54) CHUCK WITH SLEEVE HAVING METAL INSERT

(75) Inventors: Stuart E. Garber, Towson, MD (US); Joao Norona, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 642 days.

(21) Appl. No.: 12/860,084

(22) Filed: Nov. 19, 2010

(65) Prior Publication Data

US 2012/0126495 A1 May 24, 2012

(51) Int. Cl.
*B23B 31/16* (2006.01)

(52) U.S. Cl.
USPC .............................. 279/62; 279/140; 279/902

(58) Field of Classification Search
USPC ...................................... 279/60–65, 140, 902
IPC ........................................................ B23B 31/16
See application file for complete search history.

(56) References Cited

U.S. PATENT DOCUMENTS

| 5,409,243 | A | * | 4/1995 | Shadeck et al. | 279/157 |
| 5,465,983 | A | * | 11/1995 | Owens et al. | 279/157 |
| 5,476,273 | A | * | 12/1995 | Shadeck et al. | 279/60 |
| 6,045,141 | A | * | 4/2000 | Miles et al. | 279/62 |
| 6,390,481 | B1 | * | 5/2002 | Nakamuro | 279/62 |
| 7,431,308 | B2 | * | 10/2008 | Cachod | 279/62 |
| 7,527,273 | B2 | * | 5/2009 | Bordeianu | 279/62 |
| 7,708,288 | B2 | * | 5/2010 | Bordeianu et al. | 279/62 |
| 7,984,913 | B2 | * | 7/2011 | Bordeianu et al. | 279/62 |
| 8,328,205 | B2 | * | 12/2012 | Bordeianu et al. | 279/62 |
| 2007/0069483 | A1 | * | 3/2007 | Bordeianu et al. | 279/62 |
| 2008/0042375 | A1 | * | 2/2008 | Yaksich | 279/62 |
| 2009/0045594 | A1 | * | 2/2009 | Yaksich | 279/62 |

* cited by examiner

*Primary Examiner* — Eric A Gates
(74) *Attorney, Agent, or Firm* — Scott B. Markow

(57) ABSTRACT

A tool chuck includes a body supporting a plurality of jaws, and a sleeve that is operatively connected to the jaw. The sleeve may be rotated to open and close the jaws. The sleeve includes a radial inward facing surface with recesses that are covered by a metal insert. The metal insert provides a metal-to-metal interface for a lock feature.

20 Claims, 5 Drawing Sheets

CHUCK WITH SLEEVE HAVING METAL INSERT

BACKGROUND

1. Field

This disclosure relates in general to tool chucks for attachment of accessories to power drivers, and more particularly to a tool chuck having a plastic sleeve with a metal insert.

2. Description of Related Art

Tool chucks may be tightened or loosed by hand or actuation of the driver motor. Such chucks are known to include a ratchet feature and a lock feature. The ratchet feature allows rotation of a nut in a tightening direction, and prevents rotation of the nut in a loosening direction to prevent the chuck jaws from inadvertently releasing the accessory shank during use (e.g., during heavy vibration in high clutch settings or hammer drilling).

The lock feature functions to retain the sleeve in a first position relative to the nut so that the ratchet feature is inactive, thereby allowing the chuck to be tightened or loosened. The lock feature can also retain the sleeve in a second position relative to the nut so that the ratchet feature is active, thereby allowing the chuck to be tightened, but not loosened.

Although conventional chuck designs are generally thought to be acceptable, they are not without shortcomings. For example, the lock feature is provided by a metal component in the chuck interacting with the sleeve, which is typically fabricated from a plastic material. During this interaction, the metal component may slide across features provided in the plastic sleeve. This sliding action may cause the plastic sleeve to wear to the point that the lock feature may no longer retain the sleeve in the desired position.

SUMMARY

According to an example, non-limiting embodiment, a chuck for a power driver includes a body configured to rotate with a drive shaft of the power driver. A plurality of jaws are moveably mounted on the body. A sleeve is rotatably mounted about the body. The sleeve is operatively connected to the jaws so that rotation of the sleeve relative to the body moves the jaws relative to the body. The sleeve has a plastic portion with a radial inward facing surface that extends circumferentially around the body. The radial inward facing surface is provided with at least two recesses. A metal insert is fixed to the radial inward facing surface and defines at least two metal recesses that respectively cover the at least two recesses in the plastic portion. The metal insert extends circumferentially only partially around the periphery of the body.

According to another example, non-limiting embodiment, a chuck for a power driver includes a body configured to rotate with a drive shaft of the power driver. A plurality of jaws are moveably mounted on the body. A sleeve is rotatably mounted about the body. The sleeve is operatively connected to the jaws so that rotation of the sleeve relative to the body moves the jaws relative to the body. The sleeve has a radial inward facing surface with plastic surface portions and metal surface portions that are alternately arranged in a circumferential direction of the body.

The above and other features, including various and novel details of construction and combinations of parts will be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

DESCRIPTION OF EXAMPLE, NON-LIMITING EMBODIMENTS

Figure 1:
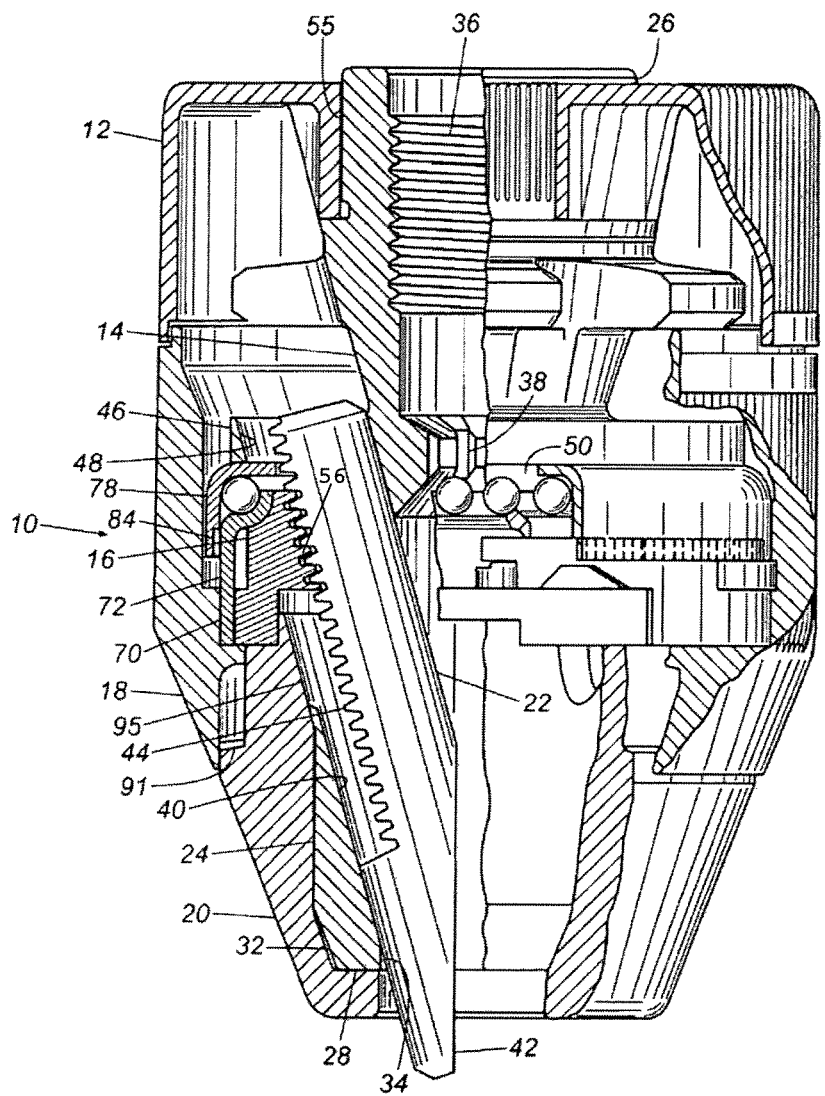
FIG. 1 is a schematic view of a conventional tool chuck.

With reference to FIG. 1, a conventional chuck 10 includes a body 14, a nut 16, a front sleeve 18, a nose piece 20 and a plurality of jaws 22. The body 14 includes a nose section 24 and a tail section 26. The nose section 24 has a front face 28 transverse to the longitudinal center axis 30 of the body 14, and a tapered surface 32 at its forward end. The nose section 24 defines an axial bore 34. A threaded bore 36 is formed in the tail section 26 and is sized to mate with the drive shaft of a powered or hand driver (not shown). The bores 34, 36 may communicate at a central region 38 of the body 14.

The body 14 defines three passageways 40 that accommodate the three jaws 22. Each jaw is separated from the adjacent jaw by an arc of approximately 120°. The axes of the passageways 40 and the jaws 22 are angled with respect to the chuck center axis. Each jaw 22 has a tool engaging face 42 generally parallel to the axis of the chuck body 14. Threads 44, formed on the jaw's outer surface, may be constructed in any suitable type and pitch.

The body 14 includes a thrust ring 46 that, preferably, may be integral with the body. It should be understood, however, that the thrust ring 46 and the body 14 may be separate components. The thrust ring 46 includes a plurality of jaw guideways 48 formed around its circumference to permit retraction of the jaws 22 therethrough, and also includes a ledge portion 50 to receive a bearing assembly as described below.

The body tail section 26 receives an optional rear sleeve 12 in a press fit at 55. Of course the rear sleeve 12 may be retained by any other suitable securing mechanism. Further, the chuck may be constructed with a single sleeve having no rear sleeve.

The nose piece 20 retains the nut 16 against forward axial movement. The nose piece is press fit to body nose section 24. It should be understood, however, that other methods of axially securing the nut on the body may be used. For example, the nut may be a two-piece nut held on the body within a circumferential groove on the outer circumference of the body.

The front sleeve 18 is secured from movement in the forward axial direction by an annular shoulder 91 on the nose piece 20. A frustoconical section 95 at the rearward end of the nose piece 20 facilitates movement of the jaws 22 within the chuck.

The front and the rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck is fabricated will depend on the end use of the chuck.

The nut 16 has threads 56 for mating with the jaw threads 44. The nut 16 is positioned about the body 14 in engagement with the jaw threads 44 so that when the nut 16 is rotated with respect to body 14, the jaws 22 will be advanced or retracted depending on the nut's rotational direction.

Figure 2:
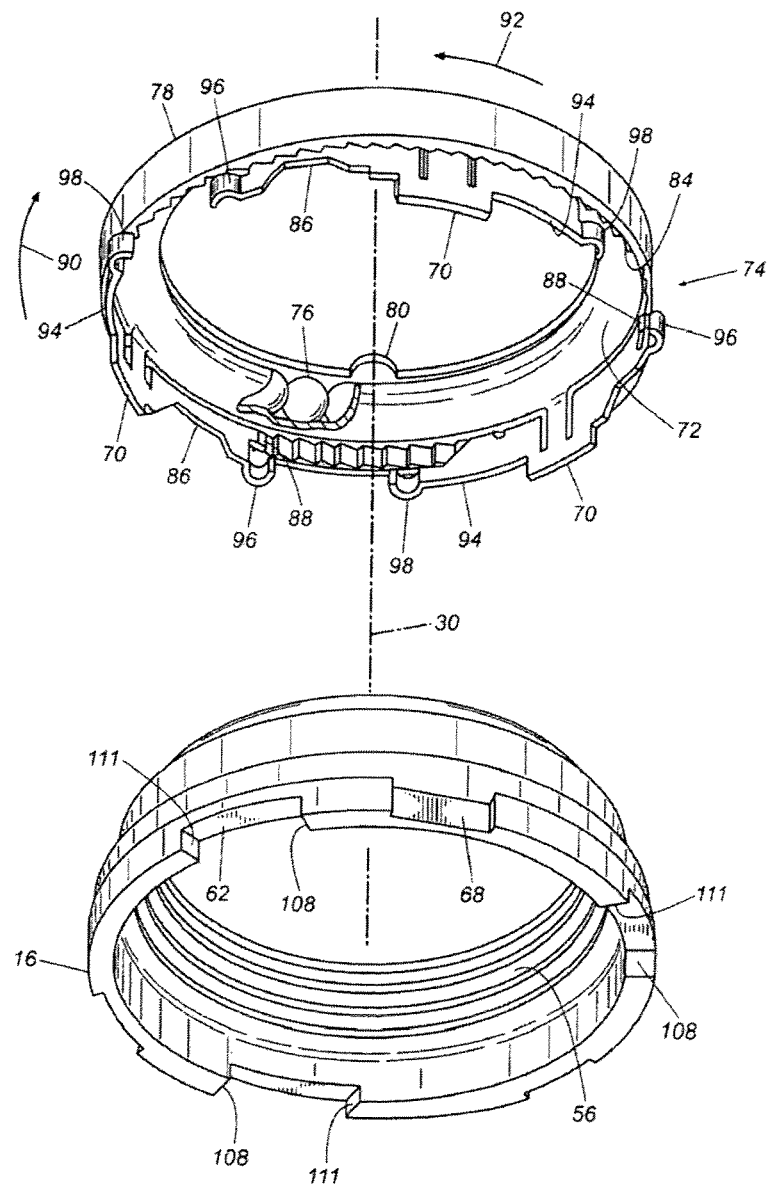
FIG. 2 is an exploded view of the bearing and nut of the chuck shown in FIG. 1.

As illustrated in FIG. 2, the nut's forward axial face includes grooves 62 that receive respective drive dogs 64 (FIGS. 3A-3C) extending from the inner surface of the front sleeve 18. The angular width of the drive dogs 64 is less than that of the grooves 62, resulting in a slight range of relative rotational movement, for example between 6° and 10° between the nut 16 and the front sleeve 18.

The nut 16 also defines a plurality of grooves formed as flats 68 about the nut's outer circumference. The flats 68 receive respective tabs 70 extending forward from an inner race 72 of a bearing assembly 74. The engagement of the tabs 70 and the flats 68 rotationally fix the inner race to the nut, although it should be understood that there may be a slight rotational tolerance between the two.

The principal load-bearing parts of the chuck include the jaws 22, the body 14, the nut 16 and the bearing assembly 74. Accordingly, these parts are typically fabricated from metal materials, such as steel for example.

The inner race 72 receives a plurality of bearing elements, in this case bearing balls 76, disposed between it and an outer race 78 seated on the thrust ring ledge 50 (FIG. 1). The outer race 78 is rotationally fixed to the body 14 by a plurality of tabs 80 received in corresponding grooves (not shown) provided in the thrust ring ledge 50. In an alternative embodiment, the outer race 78 may not be rotationally fixed with respect to the thrust ring 46, and the tabs 80 and grooves may therefore be omitted. In such an embodiment, the outer race 78 can rotate with respect to the body 14 until the jaws close onto a tool shank, at which point rearward force from the nut through the bearing gives rise to friction between the outer race 78 and the thrust ring 46 that holds the outer race in place rotationally on the body.

The outer race 78 includes a ratchet formed by a plurality of sawtooth-shaped teeth 84 disposed about the inner circumferential surface of the outer race 78. A first pawl 86 extends from one side of each tab 70. The first pawl 86 is biased radially outward from the inner race, thereby urging a distal end 88 of each first pawl 86 towards the outer race ratchet.

Each tooth 84 has a first side with a slope approaching 90° with the periphery of the outer race. A second side of each tooth 84 has a lesser slope. The first pawl 86 is deflectable and is generally disposed in alignment with the slope of the second side. Thus, rotation of the inner race 72 in a closing direction 90 with respect to the outer race 78 moves the first pawl distal ends 88 repeatedly over the teeth 84, causing a clicking sound as each end 88 falls against each subsequent tooth second side. This configuration of teeth and first pawls 86, however, prevents the inner race's rotation in an opposite opening direction 92. Application of rotational force to the inner race 72 in the opening direction 92 forces the distal ends 88 into the steep-sloped first sides of the teeth 84. Since the pawl 86 is generally perpendicular to the first sides, it does not deflect inward to permit rotation. The direction 90 corresponds to the chuck's closing direction, while the direction 92 corresponds to the chuck's opening direction. Accordingly, when the pawls 86 engage the ratchet teeth 84, the teeth permit the inner race's movement in the chuck's closing direction 90 but prevent its movement in the opening direction 92.

A second deflectable pawl 94 extends from the other side of each tab 70. Like the first pawls 86, each second pawl 94 is biased radially outward. Unlike the first pawls 86, however, the second pawls 94 do not engage the outer race ratchet.

Figure 3A:
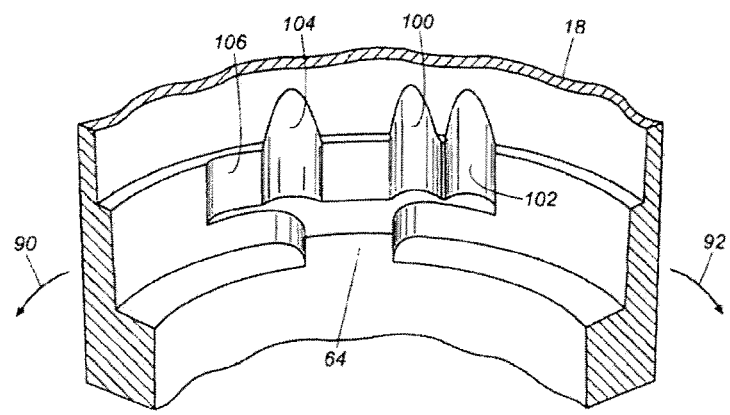
FIG. 3A is a partial perspective view of the sleeve of the chuck shown in FIG. 1.

The first and the second pawls 86 and 94 include tabs 96 and 98, respectively, at their distal ends. Turning briefly to FIG. 3A, an inner circumferential surface of the sleeve 18 defines first and second recesses 100 and 102. Each tab 98 is received in one of the recesses 100 and 102, depending on the sleeve's rotational position with respect to the nut 16 as discussed in more detail below. The sleeve 18 also defines a third recess 104 and a cam surface 106. Depending on the sleeve's rotational position with respect to the nut 16, each tab 96 is received either by the cam surface 106 or by the recess 104. The sleeve 18 includes a pair of recesses 100, 102 for each tab 98 and a recess 104 and a cam surface 106 for each tab 96.

Figure 3B:
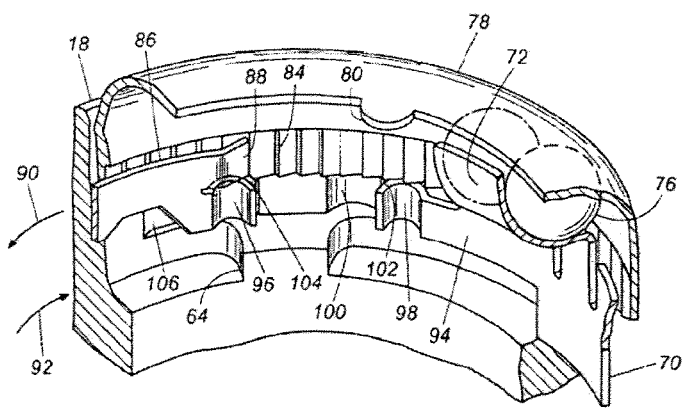
FIGS. 3B and 3C are partial perspective views of the bearing and sleeve of the chuck shown in FIG. 1.
Figure 3C:
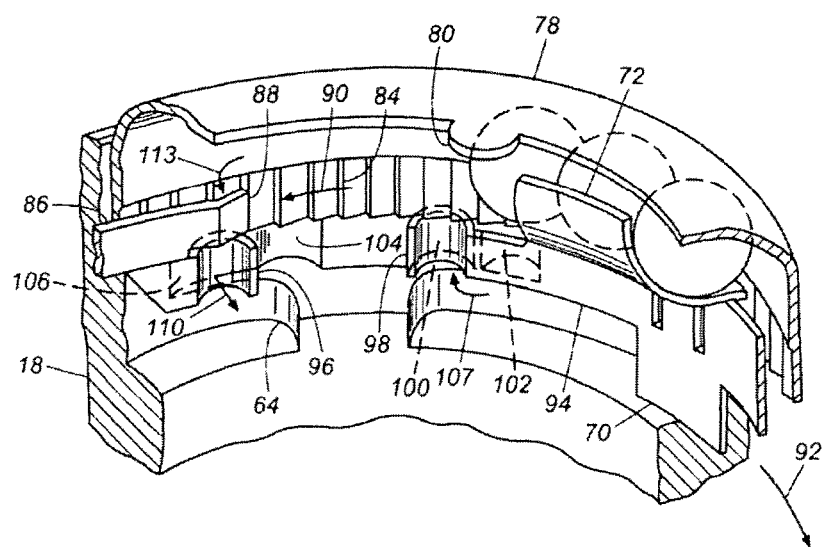

FIG. 3C illustrates the disposition of pawls 86 and 94 when the sleeve 18 is in a first position with respect to the nut 16, while FIG. 3B illustrates these components when the sleeve 18 is in a second position with respect to the nut 16. For ease of illustration, both figures omit the nut. However, referring to FIGS. 2 and 3A and to the sleeve's second position as shown in FIG. 3B, each drive dog 64 is disposed against or adjacent to a side 108 of the groove 62 in which it is received. Each of the sleeve's recesses 102 receives a tab 98 of a second pawl 94, and each recess 104 receives a tab 96 of a first pawl 86. Accordingly, the distal end 88 of each first pawl 86 engages the ratchet teeth 84, and the inner race 72 can rotate only in the closing direction 90 with respect to the outer race 78.

Referring now to FIG. 3C, when the front sleeve 18 moves in the opening direction 92 with respect to the outer race 78, each tab 98 rides up and out its recess 102 and into its recess 100, as indicated by arrow 107. Each tab 96 rides up and out of its recess 104 and onto its cam surface 106, as indicated by arrow 110. As indicated by arrow 113, this pushes each deflectable tab 86 radially inward, thereby disengaging the distal ends 88 from the ratchet teeth 84. Thus, the inner race 72 is free to rotate with respect to the outer race 78.

When the sleeve 18 rotates in the opening direction 92 so that the inner race 72 moves from the position shown in FIG. 3B to the position shown in FIG. 3C, the drive dogs 64 move within the grooves 62 of the nut 16 (FIG. 2) so that each drive dog 64 is against or immediately adjacent to a side 111 of the groove 62.

In operation, when the chuck is between the fully opened and the fully closed positions, the nut grooves 62 receive the drive dogs 64 so that the drive dogs are adjacent the groove sides 111. The inner race 72 is disposed with respect to the outer race 78 so that the tabs 96 and 98 are received by the cam surface 106 and the recess 100, respectively. That is, the sleeve 18 is in the first position with respect to the nut 16, as shown in FIG. 3C. In this condition, the tabs 98 and the recesses 100 rotationally lock the inner race 72 to the sleeve 18. Since the inner race 72 is rotationally locked to the nut 16 by the tabs 70 and the flats 68, an operator rotating the sleeve 18 rotationally drives the nut 16 through the bearing's inner race 72, thereby opening or closing the jaws.

The operator may rotate the sleeve 18, the inner race 72 and the nut 16 in the closing direction 90 to the point that the jaws tighten onto the shank of an accessory. The wedge between the nut threads and jaw threads increasingly resists the nut's rotation. When the operator continues to rotate sleeve 18 and the resistance overcomes the hold provided by the tabs 98 in the recesses 100, the sleeve 18 rotates with respect to the nut 16 and the inner bearing race 72. This moves the drive dogs 64 from the sides 111 of the grooves 62 to the sides 108 and pushes the tabs 98 out of the recesses 100 into the recesses 102. Simultaneously, the cam surfaces 106 rotate away from the tabs 96 so that the tabs 96 are released into the recesses 104, thereby engaging distal the ends 88 of the first pawls 86 with the ratchet teeth 84, as shown in FIG. 3B. At this point, the inner race 72 (and therefore nut 16) is rotationally locked to the outer race 78 (and therefore the body 14) against rotation in the chuck's opening direction 92. That is, the nut 16 is rotationally locked to the chuck body 14 in the opening direction 92. This prevents inadvertent opening during use.

The inner race 72 (and therefore the nut 16) may, however, still rotate with respect to the outer race 78 (and therefore the body 14) in the chuck's closing direction 90. During such rotation, the sleeve 18 drives the nut 16 through the drive dogs 64 against the groove sides 108, as well as through the inner race 72. This continues to tighten the chuck and as described above and produces a clicking sound to notify the operator that the chuck is in a tightened position.

To open the chuck, the operator rotates the sleeve 18 in the opening direction 92. The sleeve 18 transfers this torque to the inner race 72 at the engagement of the tabs 96 and 98 in the recesses 104 and 102, respectively. Because the pawls 86 engage the outer race 78, which is rotationally fixed to the body 14, the inner race 72 cannot rotate with the sleeve 18. Thus, upon application of sufficient torque in the opening direction 92, the sleeve 18 moves with respect to the inner race 72 and the nut 16. This moves the tab 96 back up onto the cam surface 106, thereby disengaging the first pawl 86 from the ratchet teeth 84. The tab 98 moves from the second recess 102 into the first recess 100, and the drive dogs 64 move from the sides 108 to the sides 111 of the grooves 62. Thus, the sleeve 18 moves to its first position with respect to the nut 16, as shown in FIG. 3C, and the inner race 72 and the nut 16 are free to rotate with respect to the outer race 78 and the chuck body 14. Accordingly, further rotation of the sleeve 18 in the opening direction 92 moves the jaws 22 away from the chuck axis, thereby opening the chuck.

As discussed in detail above, the metal tab 98 of the inner race 72 is received in one of the recesses 100 and 102 of the plastic sleeve 18 to lock the sleeve's rotational position with respect to the nut 16. During a movement between the recesses, the metal tab 98 is elastically deflected in a radial inward direction by sliding up and over the side wall of one recess. Once the metal tab 98 clears the transition area between the two recesses 100 and 102 it then springs back in a radial outward direction and into the other recess. By virtue of this interaction, the metal tab 98 may wear and/or deform the transition area of the plastic sleeve to a point that the lock feature may no longer retain the sleeve in the desired rotational position relative to the inner race 72 and the nut 16.

Figure 4:
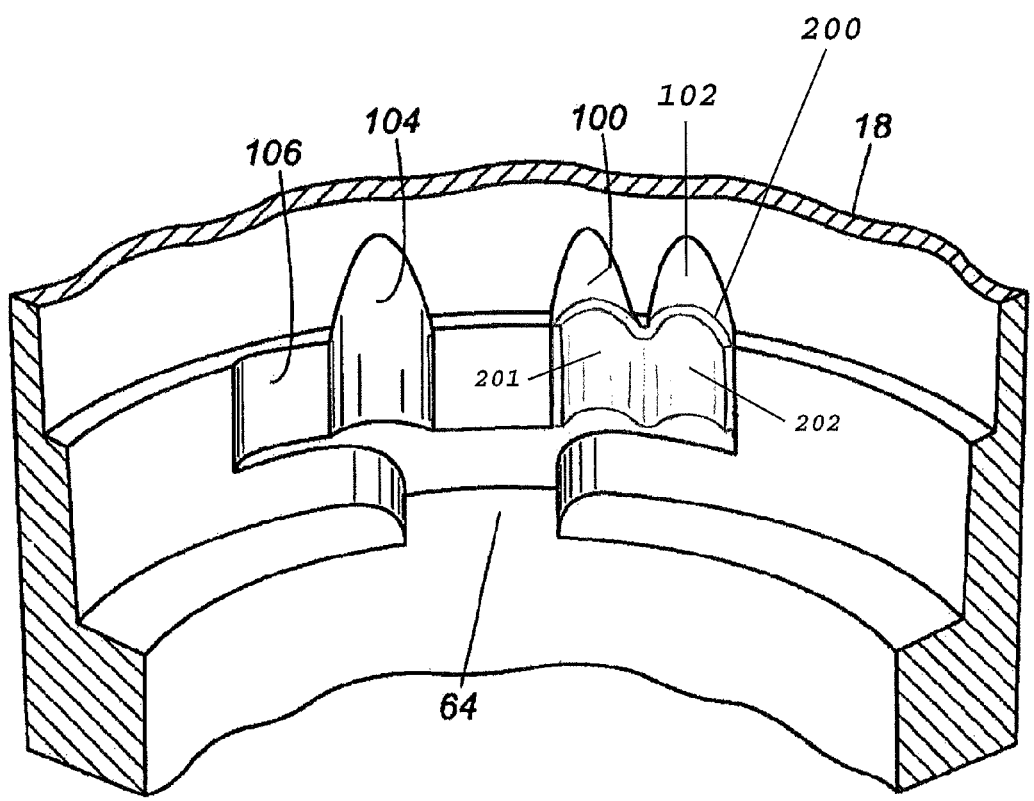
FIG. 4 is a partial perspective view of a sleeve having a metal insert in accordance with an example, non-limiting embodiment of the present invention.

FIG. 4 illustrates an example embodiment of a plastic sleeve 18 with a metal insert 200 provided in the recesses 100 and 102. The inner surface of the metal insert 200 defines recesses 201 and 202 that respectively correspond to the recesses 100 and 102 provided in the plastic sleeve 18. The metal insert 200 also covers and strengthens the transition area of the plastic sleeve 18 between the recesses 100 and 102.

The sleeve 18 depicted in FIG. 4 may be suitably implemented in the chuck 10 depicted in FIG. 1, such that the metal tab 98 interacts with the metal insert 200 (rather than interacting directly with the plastic material of the sleeve). In this way, the metal insert 200 provides a metal-to-metal interface for the lock feature. The metal insert 200 provides a more robust and rigid surface for the metal tab 98 to interact with.

As shown, the metal insert 200 covers only the recesses 100 and 102 (and the interposed transition area) of the sleeve 18. In this way, the metal insert 200 provides localized protection for those features of the sleeve that may be more susceptible to wear. This reduces the amount of metal that would otherwise be provided in the sleeve, which may advantageously reduce the weight of the sleeve, reduce the cost of manufacture/materials, and maintain the compactness of the chuck. The remainder of the sleeve may be fabricated from plastic materials so as to reduce the cost and weight of the sleeve.

In alternative embodiments a metal insert may also be provided in the recess 104 and the cam surface 106 of the sleeve. Here, however, the transition area of the plastic sleeve between the recess 104 and the cam surface 106 is more robust and bulky. Accordingly, this portion of the plastic sleeve is less susceptible to wear (and possible failure) due to the interaction with the tab 96.

By way of example only, the metal insert 200 may be stamped from sheet stock. The metal insert 200 may be fabricated from steel, or some other metal material that is well known in this art. The metal insert 200 may be fabricated from the same metal material as the inner race 72.

The sleeve may be molded about the metal insert 200 via numerous and varied molding techniques that are well known in this art, such as insert molding for example. The sleeve may also retain the metal insert 200 via a press fitting between the parts and/or via use of conventional adhesives or other mechanisms that are well known in this art.

Although the disclosed embodiments have been described implemented in a chuck having threaded jaws, it will be readily apparent to those skilled in the art that alternative embodiments may be suitably implemented in chucks having pusher-style jaws.

In the disclosed embodiments, the metal insert 200 interacts with the tab 98 of the inner race 72 to provide a lock feature. It will be appreciated that in alternative embodiments, the metal insert 200 may interact with features of the chuck (other than the inner race 72) intended to retain the sleeve in one or more rotational positions relative to that feature.

Moreover, in the disclosed embodiments, the metal insert 200 includes two recesses 201 and 202. In alternative embodiments, the metal insert 200 may include more than two recesses. This would be applicable where, for example, it is desirable to retain the sleeve in more than two different rotational positions relative to another element of the chuck.

It will be appreciated that a plurality of metal inserts may be provided on the radial inward facing surface of the sleeve. The metal inserts may be spaced apart in a circumferential direction and/or an axial direction. The metal inserts may be located to provide localized protection for those features of the sleeve that may be more susceptible to wear. The metal inserts may have the same shape or different shapes.

What is claimed is:

1. A chuck for a power driver having a rotatable drive shaft, the chuck comprising:
    a body configured to rotate with the drive shaft;
    a plurality of jaws moveably mounted on the body;
    a sleeve rotatably mounted about the body, the sleeve operatively connected to the jaws so that rotation of the sleeve relative to the body moves the jaws relative to the body, the sleeve having a plastic portion with a radial inward facing surface that extends circumferentially around the body, the radial inward facing surface provided with at least two recesses; and
    a metal insert fixed to the radial inward facing surface and defining at least two metal recesses that respectively cover the at least two recesses in the plastic portion, the metal insert extending circumferentially only partially around the periphery of the body.

2. The chuck according to claim 1, wherein the metal insert covers a transition area of the radial inward facing surface located between the at least two recesses.

3. The chuck according to claim 2, wherein the metal insert covers only the at least two recesses and the transition area of the radial inward facing surface.

4. The chuck according to claim 1, wherein the metal insert is fabricated from steel.

5. The chuck according to claim 1, wherein the plastic portion is molded about the metal insert.

6. The chuck according to claim 1, wherein the radial inward facing surface includes at least three recesses situated around a circumference of the body and at the same longitudinal position relative to the body, wherein the metal insert does not cover one of the at least three recesses.

7. The chuck according to claim 1, comprising:
a first bearing race adjacent to the body;
a second bearing race adjacent to the sleeve; and
a plurality of bearing elements disposed between the first and the second bearing races;
wherein one of the first bearing race and the second bearing race defines a tab biased in a radial outward direction and engaged with the metal insert.

8. The chuck according to claim 7, wherein the tab and the metal insert are fabricated from the same material.

9. The chuck according to claim 1, comprising:
a plurality of the metal inserts fixed to the radial inward facing surface of the plastic portion.

10. The chuck according to claim 9, wherein the metal inserts are spaced apart from each other in a circumferential direction.

11. The chuck according to claim 9, wherein the metal inserts are spaced apart from each other in an axial direction.

12. A chuck for a power driver having a rotatable drive shaft, the chuck comprising:
a body configured to rotate with the drive shaft;
a plurality of jaws moveably mounted on the body; and
a sleeve rotatably mounted about the body, the sleeve operatively connected to the jaws so that rotation of the sleeve relative to the body moves the jaws relative to the body; and
wherein the sleeve has a radial inward facing surface with plastic surface portions and metal surface portions that are alternately arranged in a circumferential direction of the body about a locking mechanism that is configured to selectively lock the sleeve to the body in an opening rotational direction, with the metal portions engaging the locking mechanism.

13. The chuck according to claim 12, wherein the metal surface portions define at least two recesses.

14. The chuck according to claim 13, wherein the plastic surface portions define at least one recess.

15. The chuck according to claim 12, wherein the metal surface portions are defined by metal inserts fixed to the sleeve.

16. The chuck according to claim 15, wherein the metal inserts are fabricated from steel.

17. The chuck according to claim 12, comprising:
a first bearing race adjacent to the body;
a second bearing race adjacent to the sleeve; and
a plurality of bearing elements disposed between the first and the second bearing races;
wherein one of the first bearing race and the second bearing race defines a plurality of tabs biased in a radial outward direction and respectively engaged with the metal surface portions of the sleeve.

18. The chuck according to claim 17, wherein the tabs and the metal surface portions are fabricated from the same material.

19. The chuck according to claim 12, further comprising a nut driven by the sleeve to move the jaws relative to the body.

20. The chuck according to claim 19, wherein the locking mechanism comprises a locking pawl coupled to the nut and locking teeth coupled to the body, the locking pawl selectively engaging the locking teeth to rotationally lock the nut to the body.

* * * * *